United States Patent [19]
Murai et al.

[11] Patent Number: 5,274,843
[45] Date of Patent: Dec. 28, 1993

[54] PAGING APPARATUS HAVING A BATTERY SAVING FUNCTION

[75] Inventors: Makoto Murai; Kiyoshi Wagai; Tatsuaki Sekigawa, all of Tokyo, Japan

[73] Assignee: Kabushiki Kaisha Toshiba, Japan

[21] Appl. No.: 821,862

[22] Filed: Jan. 16, 1992

Related U.S. Application Data

[63] Continuation of Ser. No. 602,940, Oct. 25, 1990, abandoned, which is a continuation of Ser. No. 275,302, Nov. 23, 1988, abandoned.

[30] Foreign Application Priority Data

Nov. 28, 1987 [JP] Japan .................. 62-300407

[51] Int. Cl.$^5$ ................... H04B 1/16; H04Q 3/02
[52] U.S. Cl. .................. 455/38.3; 455/343; 340/825.47
[58] Field of Search ........... 455/68, 70, 67.1, 38.3, 455/127, 343, 35; 340/825.44, 825.47, 311.1

[56] References Cited

U.S. PATENT DOCUMENTS

| | | |
|---|---|---|
| 3,973,242 | 8/1976 | Field et al. .................. 340/825.65 |
| 4,334,319 | 6/1982 | Gurry ............................ 455/343 |
| 4,353,065 | 10/1982 | Mori ........................... 340/825.44 |
| 4,449,248 | 5/1984 | Leslie et al. .................. 455/343 |
| 4,479,261 | 10/1984 | Oda et al. .................... 340/825.44 |
| 4,506,386 | 3/1985 | Ichikawa et al. ............. 340/825.44 |
| 4,639,726 | 1/1987 | Ichikawa et al. ............. 455/38 |
| 4,668,949 | 5/1987 | Akahori et al. .............. 340/825.47 |
| 4,679,244 | 7/1987 | Kawasaki et al. ............ 455/343 |
| 4,691,382 | 9/1987 | Nakajima ...................... 455/343 |
| 4,839,641 | 6/1989 | Mori et al. .................. 340/825.47 |

Primary Examiner—Reinhard J. Eisenzopf
Assistant Examiner—Andrew Faile
Attorney, Agent, or Firm—Banner, Birch, McKie & Beckett

[57] ABSTRACT

A paging apparatus having a battery saving function comprises a power supply to a radio circuit and a power supply control circuit. Power is turned on periodically in synchronization with the detection of synchronization signals and is turned off responsive to the detection of a predetermined sequence. The power supply to the radio circuit remains turned off without being turned on periodically for a predetermined time period in response to the detection of a specific code addressed to the paging apparatus.

11 Claims, 6 Drawing Sheets

PAGING APPARATUS HAVING A BATTERY SAVING FUNCTION

This application is a continuation of application Ser. No. 07/602,940, filed Oct. 25, 1990, abandoned which is a continuation of application Ser. No. 275,302, filed Nov. 23, 1988, abandoned.

FIELD OF THE INVENTION

This invention relates to the field of radio paging systems in which paging signals are broadcast from a base station to a plurality of pagers by way of radio channels and, more specifically, to a paging system in which the batteries of pagers are efficiently saved.

DESCRIPTION OF THE RELEVANT ART

Generally, it is required to reduce power consumption in pagers used in radio paging systems since they are battery powered, the battery having a limited power capacity.

According to prior art system, to reduce consumption of the battery in pagers, all pagers in a paging system are divided into several groups and the supply of power to a radio receiver section from the battery is periodically turned off in a pager so that only paging signals to the group to which the pager belongs are received.

Figure 1:
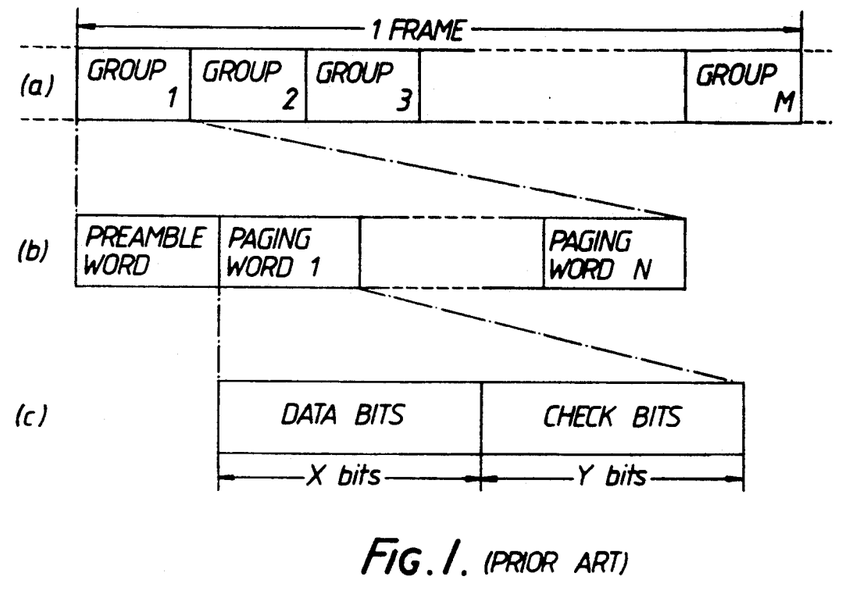
FIG. 1 is a diagram showing data formats used in a conventional paging system.

FIG. 1 shows a known signal format used in a paging system with a conventional battery saving function. Referring to FIG. 1(a), all pagers in the system are divided into M groups, for example, 15 groups. A base station repeatedly broadcasts a frame signal consisting of M group signals. Each group signal includes preamble words and N paging words (FIG. 1(b)) where N, for example, is 20. The preamble word includes a predetermined signal sequence for synchronization of received signals and a group designation signal for showing that the following paging words are addressed to pagers belonging to the group designated by the group designation signal. Each paging word includes data bits and check bits (FIG. 1(c)). The data bits consisting of X bits represents an identification number of paged (called) pagers. The check bits consisting of Y bits are for correcting an error in the data bits. The paging word consisting of data bits and check bits may be a so-called (31, 16) BCH code in which 15 check bits are appended to 16 data bits.

Figure 2:
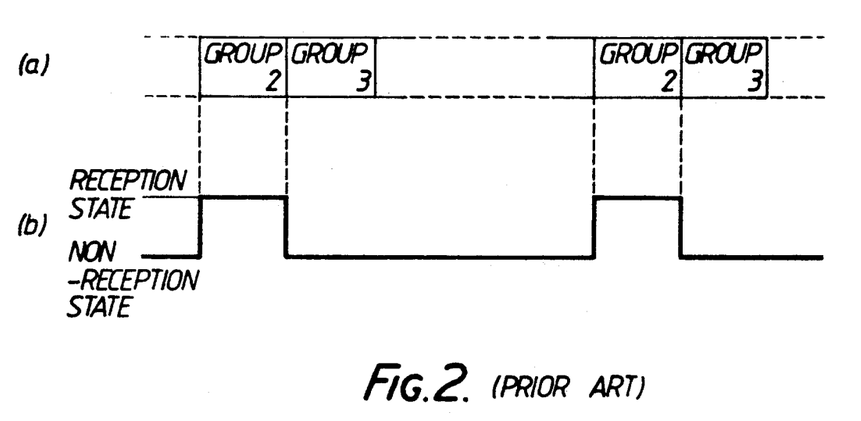
FIG. 2 is a diagram for explaining a conventional battery saving technique.

Receiving a paging request to a pager from a land line telephone via a paging exchange, the base station inserts an identification number corresponding to the paged pager into data bits of one of paging words when paging words of a group to which the pager belongs are to be broadcast. If a pager belongs to group 2, the pager automatically turns on power supply to a radio receiver section thereof only when paging words for group 2 are broadcast as shown in FIG. 2. This is indicated as the "reception state." Since paging words are broadcast periodically at a predetermined time interval, (once per frame) if the pager once synchronizes to a timing schedule in which the paging words of group 2 are broadcast, turning on/off of power supply to a radio section is thereafter automatically repeated.

A problem with the conventional battery saving technique is that power supply to the radio receiver section remains on throughout the duration when paging words to a group are to be broadcast whether paging words to a particular paging device of that group are actually broadcast or not. For example, in the middle of the night paging requests do not occur so frequently. Consequently, despite the fact that no paging words are broadcast to a pager, the pager will repeatedly turn on or off the power supply to the radio receiver section and consume the pager's battery wastefully. Furthermore, even when the paging word to a particular pager is to be broadcast, power supply to the radio receiver section is not turned off after deleting the paging word addressed to the pager, but just turned off periodically in accordance with a battery saving cycle.

SUMMARY OF THE INVENTION

It is accordingly an object of the present invention to provide an improved paging apparatus for efficiently saving the pager's battery.

It is a further object of the present invention to provide an improved paging apparatus in which power supply to a radio receiver section thereof is efficiently turned off.

It is a further object of the present invention to provide an improved paging apparatus which turns off power supply to a radio receiver section thereof responsive to the reception of a predetermined signal sequence or of a paging signal to the paging apparatus while continuing to periodically turn on the power supply.

It is still a further object of the present invention to provide an improved paging system for turning off power supply to a radio receiver section thereof for a predetermined period responsive to the reception of a predetermined signal sequence.

To achieve one or more of the objects, as embodied and described herein, the invention comprises receiving means for receiving signals broadcast over a predetermined radio channel; signal detecting means responsive to said receiving means for detecting synchronization signals and a predetermined signal sequence; power supply means for supplying said receiving means with power; power supply control means for controlling said power supply means so that power supply to said receiving means is turned on periodically in synchronization with the detection of said synchronization signals and is turned off in synchronization with the detection of said synchronization signals, when said predetermined signal sequence is not detected, and is turned off responsive to the detection of said predetermined signal sequence when said predetermined signal sequence is detected.

The problems and related problems of prior art paging apparatus are solved by the principles of the present invention. In this invention, power supply to the receiving means is turned off responsive to the detection of a paging code to the paging apparatus or a specific code indicative of no paging code for a predetermined time period. Therefore, power which would have been consumed by keeping the pager turned on for a predetermined time period in the conventional battery saving technique may be saved. Furthermore, since power supply to the receiving means is kept turned off without being turned on periodically for a predetermined time period responsive to the detection of the specific code, power consumption may be saved at times of the day when paging requests do not occur so frequently.

DETAILED DESCRIPTION

A preferred embodiment of the present invention will be described with reference to the accompanying drawings.

FIGS. 3(a) to (c) and FIGS. 4(a) and (b) are diagrams for explaining one example of a battery saving operation of a pager according to one embodiment of the present invention.

Figure 3:
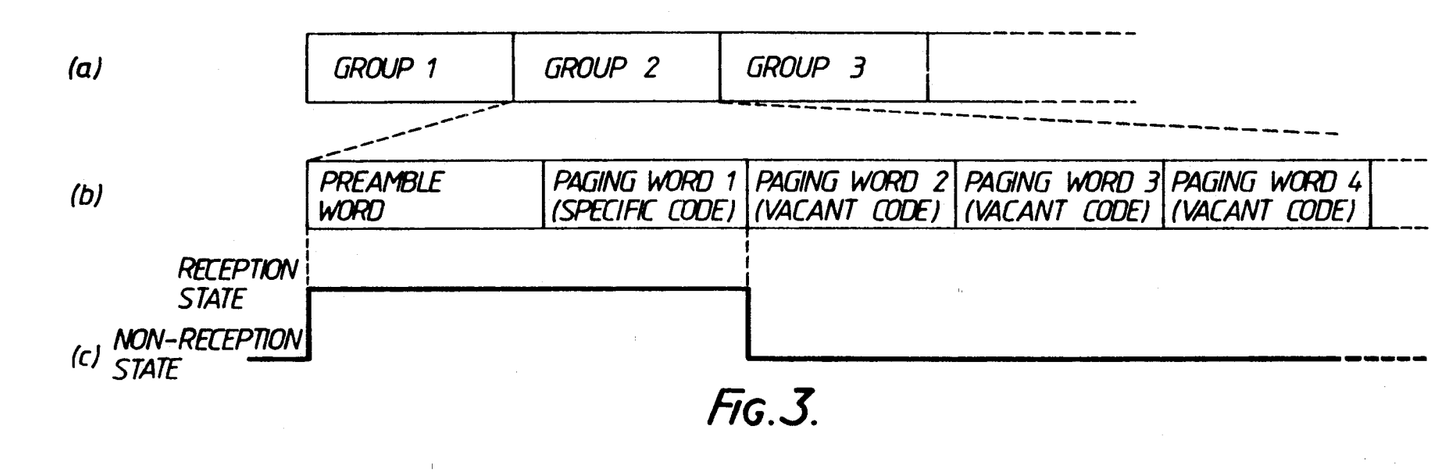
FIGS. 3 and 4 are diagrams for explaining one example of battery saving operation in accordance with the invention.

Referring to FIGS. 3(a) and (b), when there are no paging words to be broadcast to a group, for example, to group 2, a specific code is inserted in an area where paging word 1 would have been inserted at a base station in a conventional technique. The specific code consists of 16 bits of "1" followed by its check bits and is, consequently, distinguishable from any other paging words.

Referring to FIG. 3(c), after receiving these signals broadcast by the base station, a pager belonging to, for example, group 2 detects the specific code by comparing the received specific code with a specific code prestored in its memory after detecting a preamble word. Then the pager recognizes that there will not be any paging words for group 2 and turns off power supply to a radio receiver section of the pager immediately after detecting the specific code.

Figure 4:
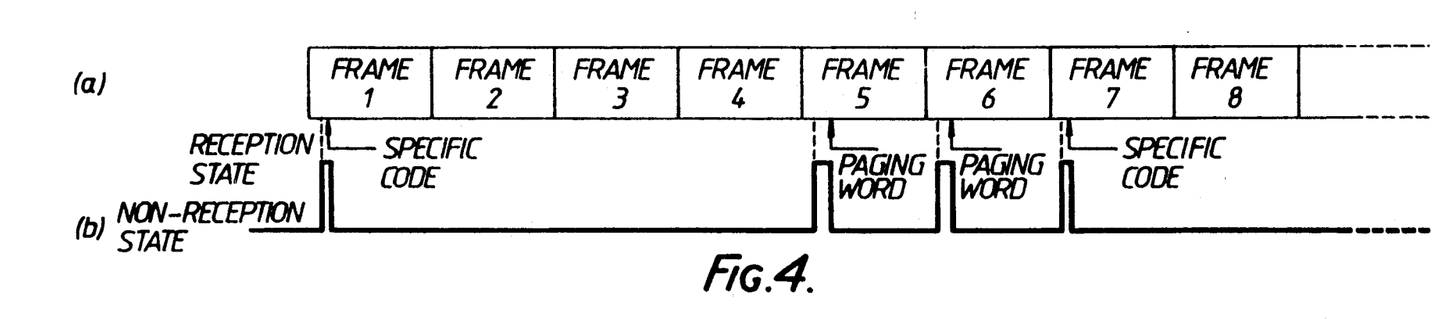

Furthermore, referring to FIG. 4, when a pager turns on again at the appropriate time for group 2 of the next frame in the conventional battery saving operation, the pager according to this embodiment continues to stay off until the following (n=3, in FIG. 4) frames have passed and turns on again at the time for group 2 of the (n+1)th frame. It should be noted that turning on power to obtain a preamble word at each frame is also not performed. Thereafter the pager resumes its usual battery saving operation until the specific code is detected. In FIG. 4 the specific code is detected again at frame 7. From the above explanation, the pager may save power consumption since the pager does not supply power to a radio receiver section immediately from the time the specific code is detected until the following n frames have passed. In the case that the base station is designed to broadcast a paging word more than (n+1) times per a paging request, i.e., a paging word responsive to a paging request is continuously included in more than (n+1) frames, the pager has at least one chance to get a paging signal even if the pager stops receiving signals for the duration in which n frames are broadcast.

Figure 5:
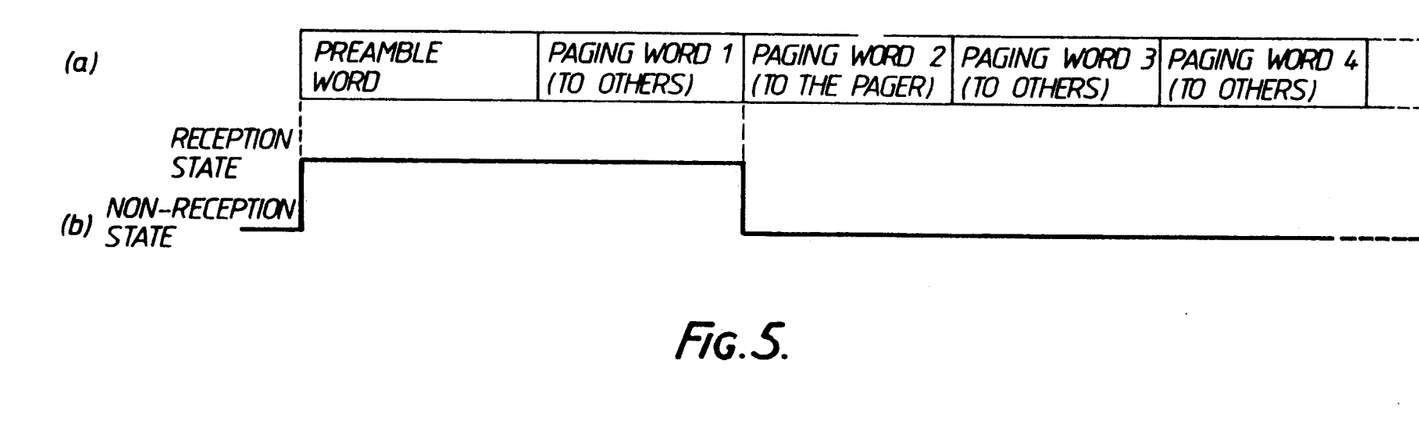
FIG. 5 is a diagram for explaining another example of battery saving operation in accordance with the invention.

FIGS. 5(a) to (b) are diagrams for explaining another example of a battery saving operation according to the embodiment of the present invention.

Referring to FIGS. 5(a) and 5(b), when there is a paging word to a pager, which is inserted at the mth paging word (m=2 in FIG. 5(a)) in a group signal, the pager detects the paging word to the pager by comparing data bits in the paging word with a prestored unique identification number. A conventional pager continues to supply power to a radio section thereof through the duration when the paging words to the group to which the pager belongs are broadcast even after a paging word to the particular pager is detected. According to the invention the pager turns off power supply to a radio section immediately after the paging word to the particular pager is detected even if other paging words for other pagers of the group are to be subsequently broadcast (FIG. 5(c)).

Figure 6:
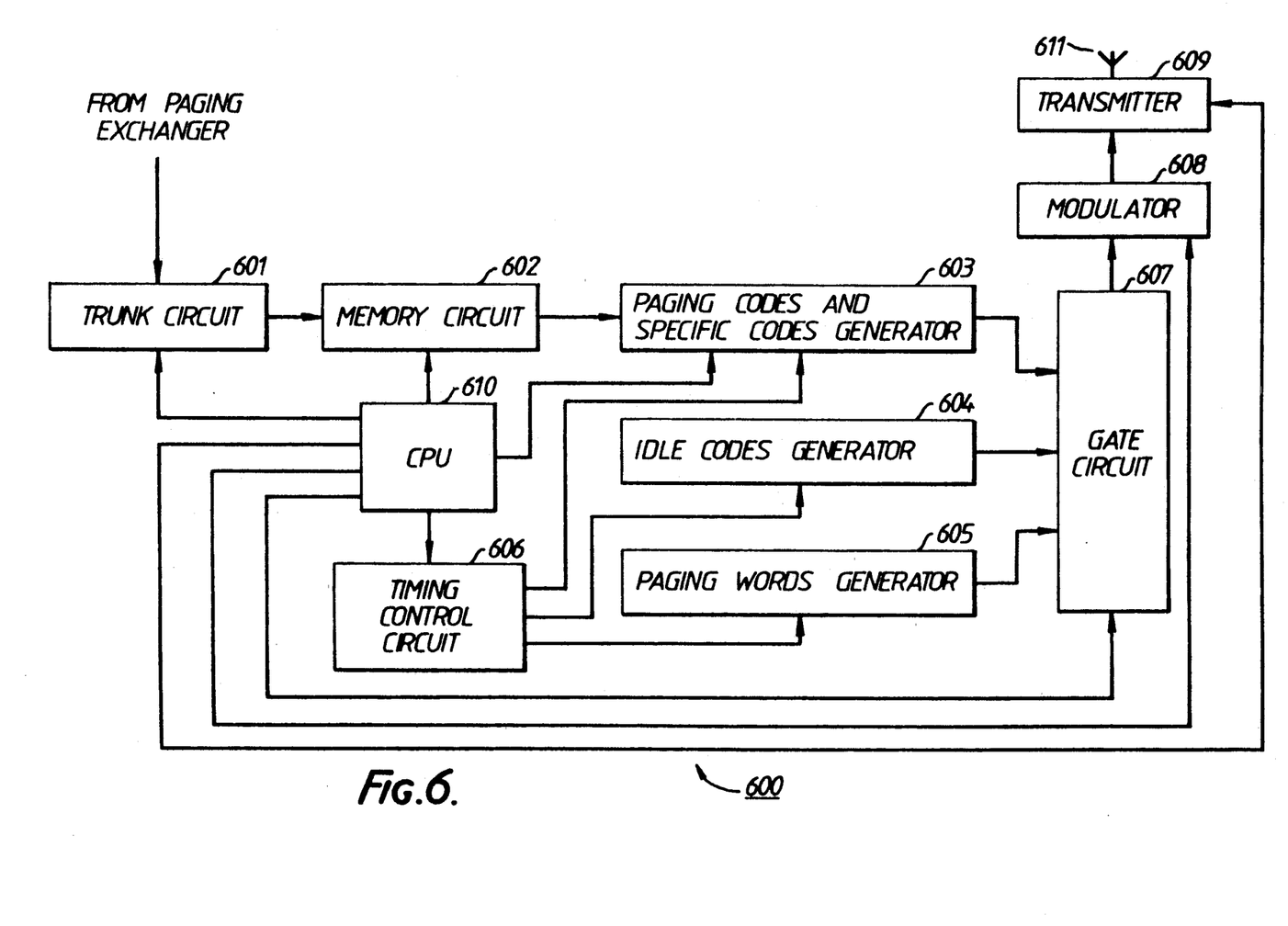
FIG. 6 is a block diagram of a base station in accordance with the invention.

FIG. 6 is a block diagram showing a modified arrangement of a base station according to the embodiment of the present invention.

Referring to FIG. 6, base station 600 comprises trunk circuit 601 for receiving paging requests with pager numbers to be paged from a paging telephone exchange and a memory circuit 602 for storing pager numbers to be paged, which are sent from trunk circuit 601. Base station 600 further comprises paging codes and specific codes generator 603 for generating data bits corresponding to the pager numbers to be paged or specific codes indicative of the absence of pager numbers to be paged and their check bits, idle codes generator 604 for generating idle codes indicative of vacancy of paging words, preamble words generator 605 for generating preamble words including synchronizing words and group designation signals, timing control circuit 606 for providing timing signals to paging codes and specific codes generator 603, and gate circuit 607. Gate circuit 607 selectively outputs signals provided by paging codes and specific codes generator 603, idle codes generator 604, or preamble words generator 605. Modulator 608 modulates an output signal from gate circuit 607 onto a radio carrier for transmission. Transmitter 609 transmits signals provided by modulator 608. Central processing unit (CPU) 610 controls the overall operations of base station 600.

CPU 610 checks for the presence of paging numbers to be paged of a particular group in memory circuit 602 when paging words for the group are to be broadcast. If at least a paging number to be paged is stored in memory at that time, CPU 610 controls each circuit so that paging words corresponding to the paging numbers are broadcast as would occur in a conventional system. In this embodiment, a paging word is broadcast five times for each paging request.

On the other hand, when there are no paging words of a group in memory circuit 602 when it is time in the frame when paging words for the group are to be broadcast, CPU 610 controls paging codes and specific codes generator 603 so that a specific code indicative of the absence of paging codes is generated from paging codes and specific codes generator 603 and controls timing control circuit 606 so that the specific code is followed by an idle code indicative of vacant paging words, which is generated in idle codes generator 604. These signals are broadcast via gate circuit 607, modulator 608, and transmitter 609 after transmission of a preamble word corresponding to the groups under control of CPU 610 over channel 611.

Figure 7:
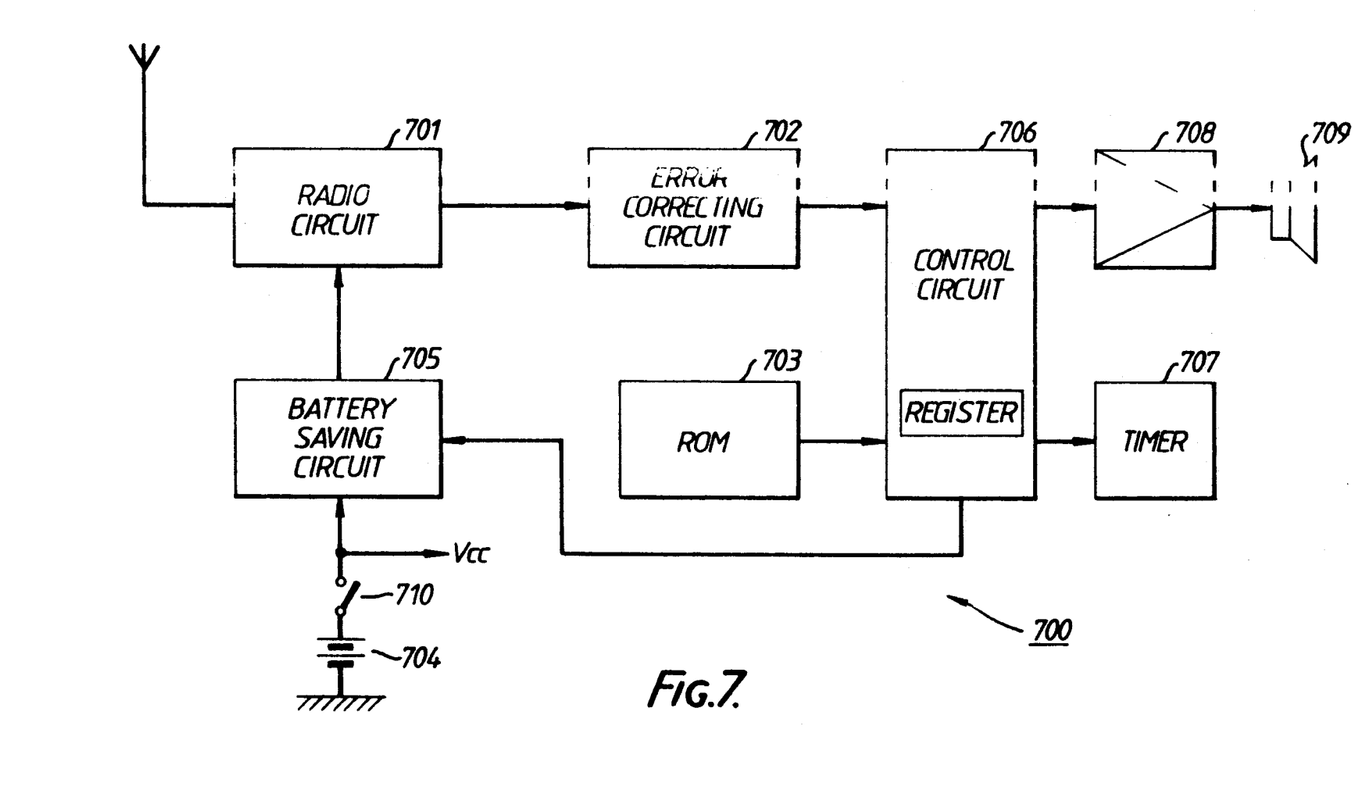
FIG. 7 is a block diagram of paging apparatus in accordance with the invention.

FIG. 7 is a block diagram showing an arrangement of paging apparatus according to the embodiment of the present invention.

Referring to FIG. 7, paging apparatus 700 comprises radio receiver circuit 701 for receiving paging signals broadcast from the base station over channel 611, error correcting circuit 702 for correcting errors in the data bits on the basis of the following check bits, read only memory (ROM) 703 for storing an identification number of the pager specific code data and other permanently stored data, battery 704 for supplying power to each circuit, and battery saving circuit 705 for providing radio circuit 701 electric power from battery 704 in response to a control signal. Control circuit 706 checks for received paging signals, generates an alarm signal, and provides the control signal to battery saving circuit 705. Clock generator 707 applies clock signals to control circuit 706. Amplifier 708 amplifies the alarm signal from control circuit 706, and a loudspeaker 709 sounds an alarming beep tone responsive to the amplified alarm signal.

Next, the operation of the paging apparatus in accordance with the embodiment will be described in detail with reference to the flow chart of FIG. 8. The algorithm is typically stored in ROM 703 but may be stored in memory of control circuit 706.

Figure 8:
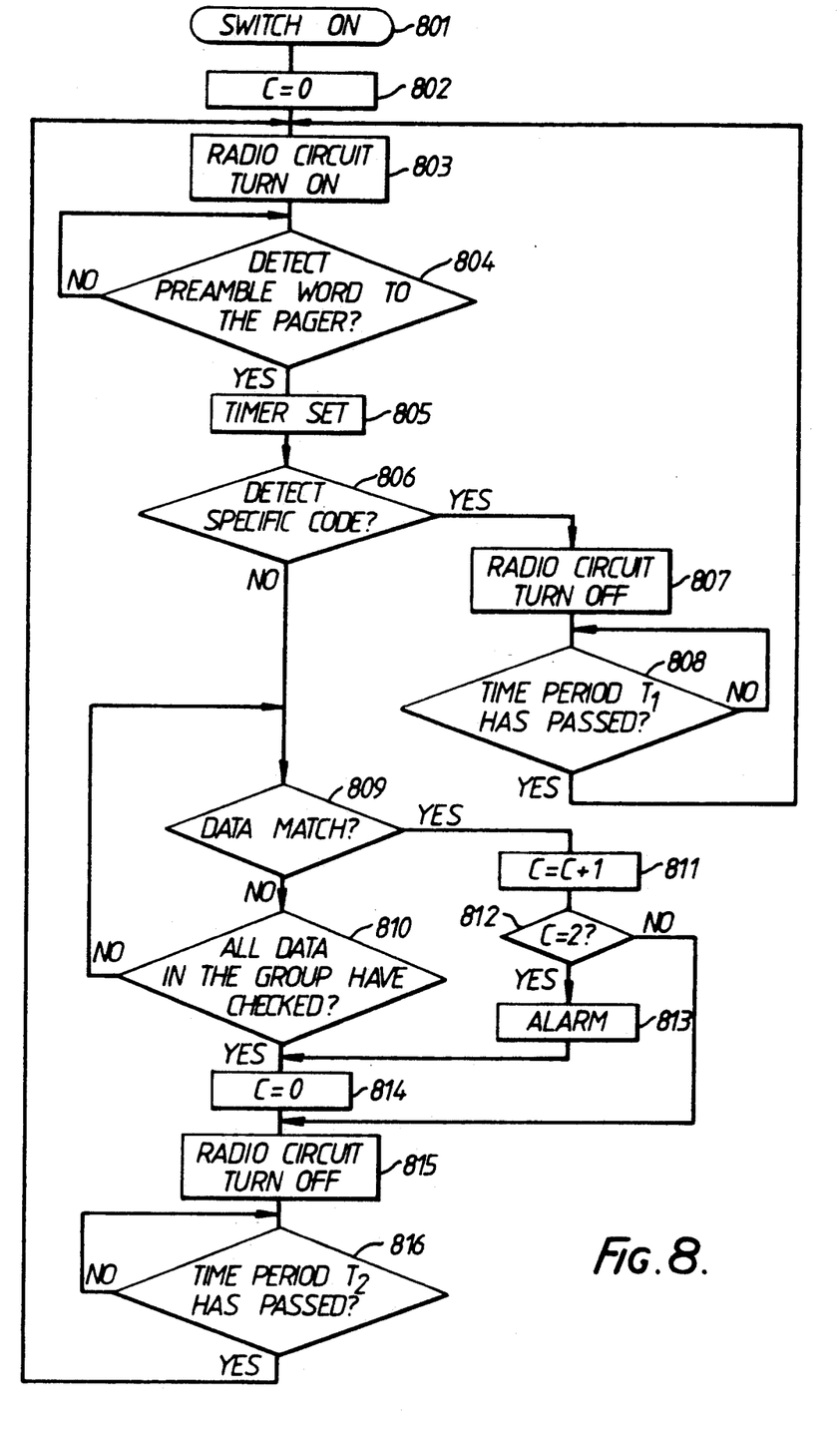
FIG. 8 is a flow chart of an algorithm showing the operation of the paging apparatus.

Referring to FIG. 8, when switch 710 is turned on (step 801), each circuit except radio circuit 701 is powered by battery 704. Count value C in a register of control circuit 706 is set to zero (step 802). The count value C represents how many times a paging word to the pager is detected. Control circuit 706 controls battery saving circuit 705 by sending the control signal so that radio circuit 701 is supplied power from a battery 704 (step 803). In radio circuit 701, a synchronization signal is detected. The synchronization signal is checked to determine whether the following group designation signal indicates the group to which the pager belongs. Thus, a preamble word consisting of synchronization signals and the group designation signal is detected (step 804) by comparing a received group designation number with one stored in memory 703.

Responsive to detection of a preamble word, control circuit 706 sets timer 707 to zero (step 805) and checks the subsequent first paging word applied from radio circuit 701 via error correcting circuit 702. In error correcting circuit 702, signal errors contained in the data bits are corrected on the basis of the following check bits. Therefore corrected data bits are applied to control circuit 706. Control circuit 706 determines whether the subsequent first paging word comprises a specific code by comparing the data bits of the paging word with the specific code read from ROM 703 (step 806).

If a specific code is detected in the first paging code, control circuit 706 sends the control signal to battery saving circuit 705 so that power supply from battery 704 to radio section 701 is turned off (step 807). Then control circuit 706 checks timer 707 set in step 805 whether time period $T_1$ has elapsed or not (step 808). In this embodiment, time period $T_1$ approximately corresponds to a period of transmission of four frames in which a preamble word is not transmitted. When time period $T_1$ has passed, the operation of the pager returns to step 803.

If the specific code is not detected in step 806, control circuit 706 checks whether there is a paging word addressed to the pager among the received paging words by comparing data bits included in the received paging words with the pager's identification number read from ROM 703 one by one (step 809 and 810). When data bits included in a paging word match with the identification number, control circuit 706 checks the count value C in the register (step 812) after incrementing one (step 811).

In this embodiment, an alarm indication to the user is generated in response to a paging word to the pager being continuously detected two times. Therefore, if the count value C equals two, control circuit 706 generates an alarm signal having a predetermined signal frequency for a predetermined time period. The alarm signal is output from loudspeaker 709 as a beep tone after being amplified by amplifier 708 (step 813). Then control circuit 706 sends the control signal to battery saving circuit 705 so that power supply from battery 704 to radio section 701 is turned off (step 815) after resetting the count value C to zero (step 814). If the count value C does not equal two, the operation of the pager proceeds to step 815 without indicating an alarm and does not reset the count value C. In either case, when a paging word to the pager is first detected, the operation of pager then proceeds to step 815 without checking the rest of the paging words. Therefore power which would have been consumed for checking other paging words may be saved.

Also if there are no paging words addressed to the pager among the received paging words, the operation of the pager proceeds to step 815 for battery saving after resetting the count value C to zero (step 814). Then control circuit 706 checks timer 707 set in step 805 whether time period $T_2$ has passed or not (step 816). Time period $T_2$ approximately corresponds to a period for the transmission of one frame in which a preamble word is not transmitted. When time period $T_2$ has passed, the operation of the pager returns to step 803.

Even though a paging word is broadcast from the base station five times for each paging request, i.e., a paging word responsive to a paging request is continuously included in five frames and the pager indicates an alarm after only two successful receptions of a paging word to the pager and stops receiving signals for a duration of three frames broadcast in the above-mentioned embodiment, the number of times may be variable depending on the system configuration. Still while time period $T_1$ is fixed in the above-mentioned embodiment, time period $T_1$ may be variably responsive to information provided by the base station. In this case, the specific code may include the information concerning the duration of the time period $T_1$. Consequently, the base station may reflect a longer duration $T_1$ in the early morning hours.

We claim:

1. Paging apparatus comprising:
   receiving means for receiving signals broadcast over a predetermined radio channel;
   signal detecting means responsive to said receiving means for detecting synchronization signals and a group designation signal comprising either a particular paging message signal addressed to the paging apparatus or a predetermined signal sequence when no paging message signals are present for any pager within a pager group;
   power supply means for supplying said receiving means with power;
   power supply control means coupled to said signal detecting means for controlling said power supply means, such that the power supply to said receiving means is periodically turned on in synchronization with said synchronization signals and turned off in synchronization with said synchronization signals, turned off upon reception of the predetermined signal sequence when no paging message signals are present for any pager within said pager group and turned off upon reception of the particular paging message signal addressed to the paging apparatus.

2. The apparatus of claim 1 wherein said power supply control means further controls said power supply means so that power supply to said receiving means remains turned off without being turned on for a second predetermined time period.

3. The apparatus of claim 2 wherein the second predetermined time period is defined responsive to information included in said predetermined signal sequence.

4. The apparatus of claim 1 wherein said signal detecting means comprises memory means for storing an identification code of the paging apparatus and comparing means for comparing the signals received by said receiving means with said identification code.

5. The apparatus of claim 4 wherein said group designation signal indicates that said predetermined signal sequence to the paging apparatus is transmitted before the subsequent synchronization signals are transmitted.

6. The apparatus of claim 5 wherein said signal detecting means detects said predetermined signal sequence responsive to the detection of both of said synchronization signals and of said group designation signal.

7. The apparatus of claim 6 further comprises indicating means for indicating reception of said predetermined signal sequence in response to the detection of said predetermined signal sequence for a predetermined number of times.

8. Paging apparatus comprising:
receiving means for receiving signals broadcast over a predetermined radio channel;
power supply means for supplying said receiving means with power;
signal detecting means responsive to said receiving means for detecting a first predetermined signal sequence including a group designation signal indicating that no paging signal for any pager in a group follows said first predetermined signal sequence within a predetermined time duration and for detecting a second predetermined signal sequence indicative of a paging message signal for said pager from signals received within said predetermined time duration;
time measuring means coupled to said signal detecting means and responsive to the detection of said first predetermined signal sequence for measuring time passage;
power supply control means coupled to said time measuring means for controlling said power supply means so as to terminate power to said receiving means for a predetermined time period upon detection of said first predetermined signal sequence or said second predetermined signal sequence.

9. Paging system comprising:
a base station including;
broadcast means for periodically broadcasting synchronization signals indicative of the position of a group signal within a frame which are followed by a specific code signal, said specific code signal being in response to absence of any paging requests for a particular group of pagers within said frame;
a paging apparatus including;
receiving means for receiving signals from said base station,
detecting means for detecting said synchronization signals and said specific code signal,
power supply means for supplying said receiving means with power, and
power supply control means for controlling said power supply means so that power supply to said receiving means is turned off upon detection of said specific code signal and power supply to said receiving means is turned off upon detection of a paging signal message addressed to the paging apparatus.

10. A method of paging one or more pagers from a base station in response to one or more paging requests, comprising the steps of:
periodically broadcasting synchronization signals followed by one or more group signals, said group signals comprising one or more paging signals or a specific code signal indicative of no paging signals for any pager within a particular group;
receiving at a pager at least one of said one or more group signals broadcast through a predetermined radio channel in synchronization with said synchronization signal received at a pager;
terminating receipt of the group signals upon reception of said specific code signal;
terminating receipt of the group signals upon reception of a paging message signal; and
alarming a user of the pager in response to the reception of said paging message signal to the pager.

11. Paging apparatus comprising:
receiving means for receiving signals broadcast over a predetermined radio channel;
power supply means for supplying said receiving means with power;
signal detecting means responsive to said receiving means for detecting a synchronization signal and a paging signal sequence indicative of a paging message for the pager from signals received by the receiving means; and
power supply control means coupled to said signal detecting means for controlling said power supply means so as to turn on the receiving means for a predetermined time period in synchronism with detection of the synchronization signal,
wherein in the event that the paging signal sequence addressed to the pager is detected by the signal detecting means during the predetermined time period, the power supply control means controls the power supply means so as to immediately turn off the receiving means in response to the detection of the paging signal sequence.

* * * * *